UNITED STATES PATENT OFFICE.

STEPHEN R. ANDRES, OF TROY, NEW YORK.

IMPROVEMENT IN ARTICLES OF FOOD MADE FROM BEANS.

Specification forming part of Letters Patent No. 32,853, dated July 23, 1861.

*To all whom it may concern:*

Be it known that I, STEPHEN R. ANDRES, of Troy, in the county of Rensselaer, in the State of New York, have invented a new and useful Article of Food Manufactured from Beans; and I do hereby declare that the following is a full and exact description of the mode of manufacturing the same.

My invention relates to the manufacture of flour, meal, grits, grains, &c., from boiled beans of any of the various kinds as an article of food especially adapted to the use of seafaring men, soldiers, travelers, and others to whom a healthy article of food easy of preparation, not liable to be injured by warm and damp climates, an article the bulk and weight of which are reduced to the lowest terms, is an object. By this process the bulk and weight of the bean are reduced twenty-two per cent., without any loss of quantity or quality of nutriment. A few minutes only are required to prepare a meal from either of my samples, as they are all boiled already, and the water used for soaking and boiling the bean in the process of manufacture has been thrown away, it is not necessary, in order to make a healthy meal, to throw away the first water in which the bean as prepared by me is boiled, as is the case with the raw bean.

To enable others to make my bean flour, meal, &c., I proceed to describe the process of its manufacture.

I take beans of good quality, and, having cleansed them from impurities, soak them in water for twelve hours, or until they are soft. I then take them out of the water, put them in a suitable vessel, and steam them until they are cooked or boiled. I then pass them between rollers, by which they are crushed and the natural adhesion of their particles is broken. I then spread them upon wire-cloth sieves and place them in a kiln or air-closet, where there is a strong current of heated air forced through them, whereby they are thoroughly dried.

What I claim as my invention, and desire to secure by Letters Patent, is—

Flour, meal, grits, grains, or any article made from boiled or otherwise cooked and desiccated beans, manufactured as herein described, or in any equivalent way.

STEPHEN R. ANDRES.

Witnesses:
R. G. ENNSON,
McD. BUCKLIN.